UNITED STATES PATENT OFFICE.

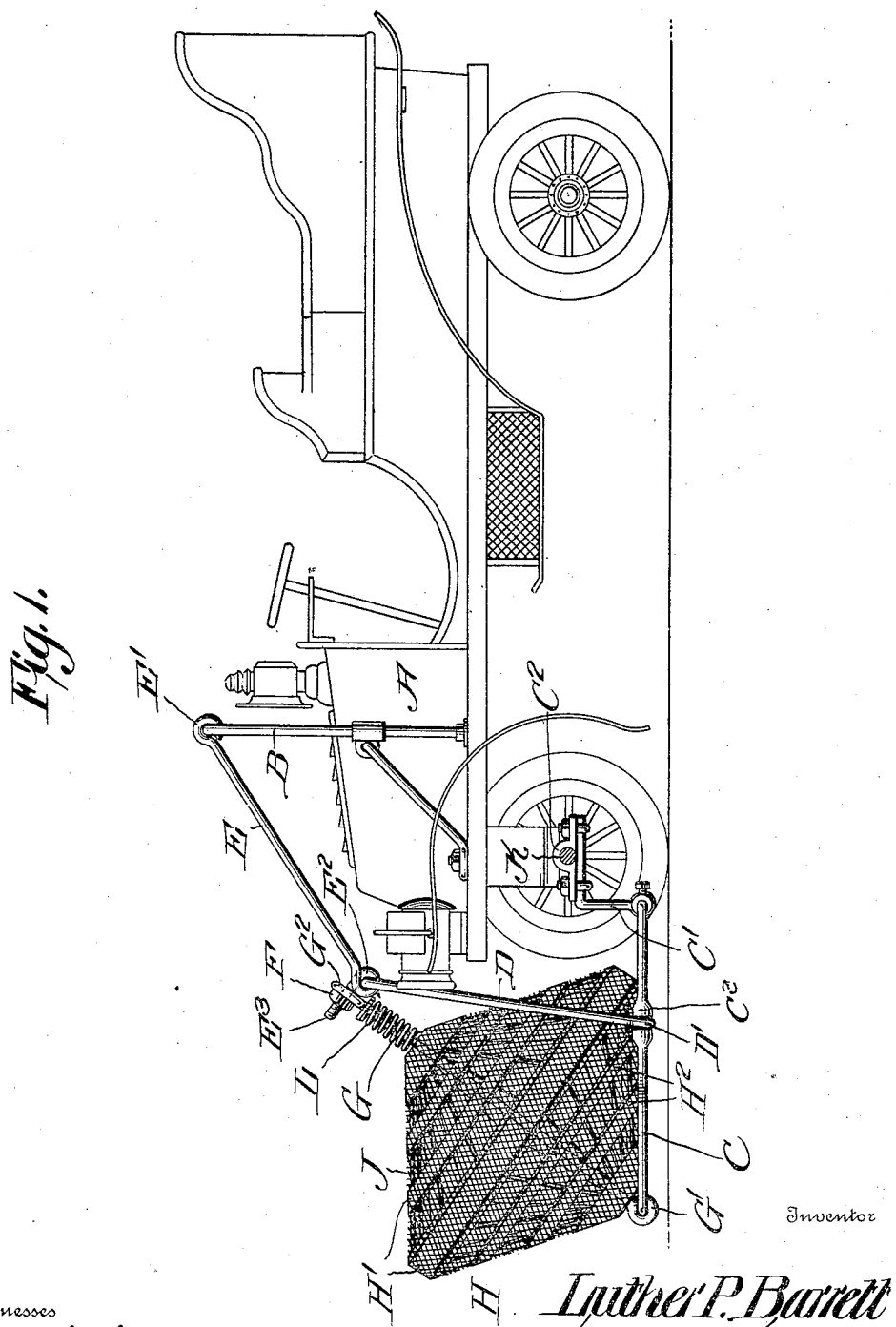

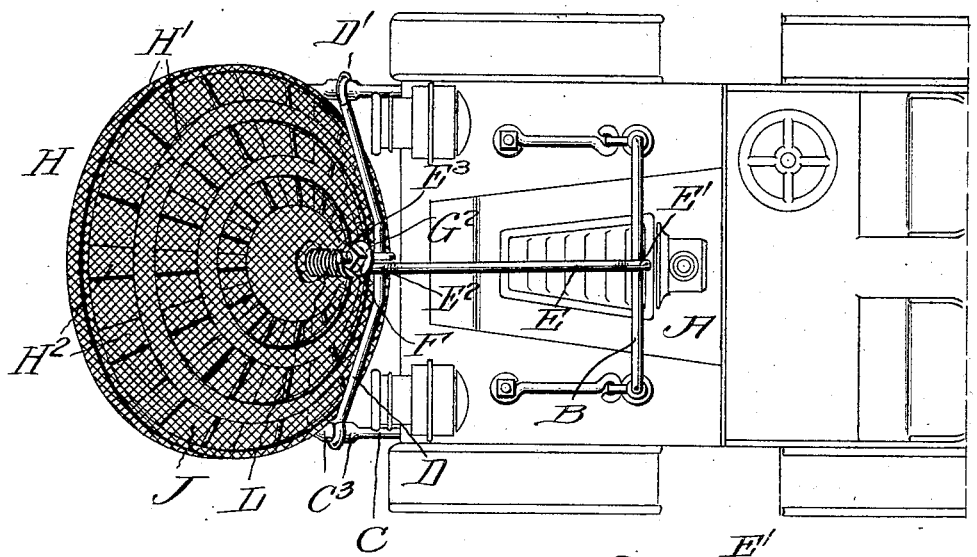
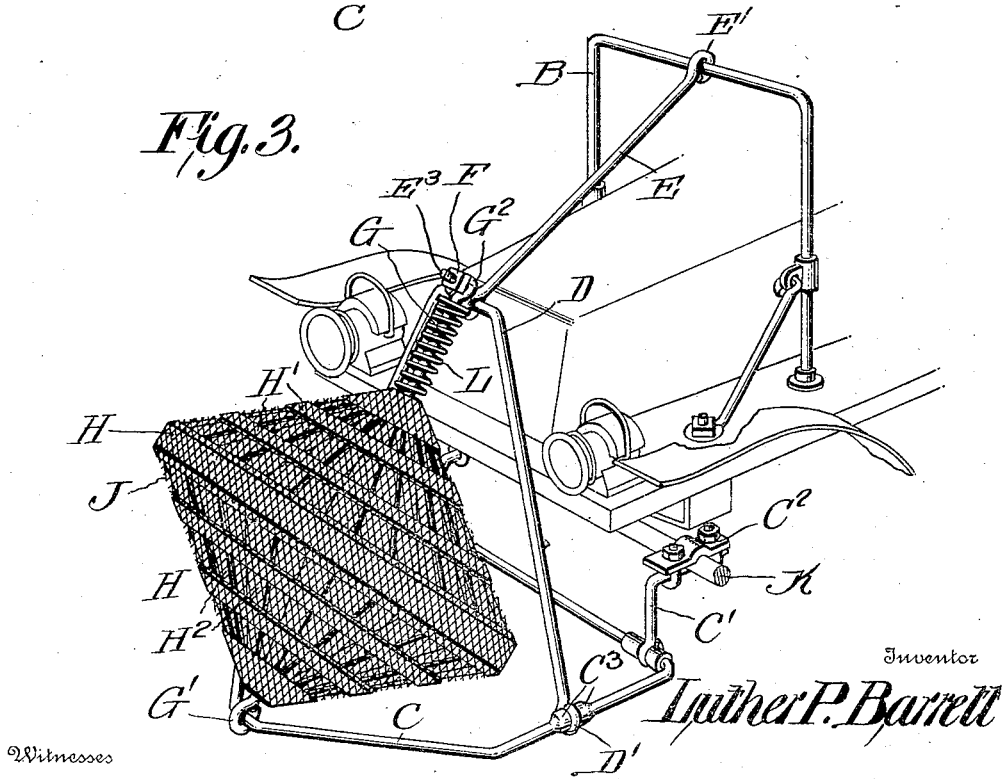

LUTHER PRINCELL BARRETT, OF ST. LOUIS, MISSOURI.

REVERSIBLE AUTOMOBILE-FENDER.

No. 868,319.  Specification of Letters Patent.  Patented Oct. 15, 1907.

Application filed March 4, 1907. Serial No. 360,509.

*To all whom it may concern:*

Be it known that I, LUTHER PRINCELL BARRETT, a citizen of the United States, residing in the city of St. Louis, in the State of Missouri, have invented a new and useful Improvement in a Reversible Automobile-Fender, of which the following is a specification.

This invention relates to an automobile fender and the object of the invention is a reversible fender and a rotatable fender.

By constructing the fender so that it can be reversed in its bearings, damage to a portion of the fender by reason of a collision or similar accident will not end the usefulness of the fender as it can be reversed, thus bringing a new and undamaged portion into position previously occupied by the part damaged.

By providing a fender in the form of a double cone and mounted rotatably in advance of the automobile any movable object coming into contact with the said fender will cause the same to rotate and the object will be moved out of the path of the car by the rotation of the fender.

The invention consists of a frame adapted to be carried by the front of an automobile which frame is provided with an upwardly and rearwardly inclined shaft, upon which shaft is rotatably mounted a fender in the form of a double cone and preferably formed of spring metal hoops arranged in oppositely disposed sets and covered with a wire of fine mesh.

In the drawings forming a part of the specification:—

Figure 1 is a side view of an automobile provided with my fender. Fig. 2 is a plan view of a fender arranged in position upon an automobile. Fig. 3 is a perspective view of a fender in position upon an automobile.

In these drawings A represents an automobile which may be of any type and upon the forward portion of the automobile is arranged a U-shaped frame B which is suitably braced and is preferably of steel strong enough to support the greater portion of the weight of the fender.

Upon the front of the automobile is arranged a substantially triangular frame C, preferably formed of metal tubing and this frame is supported at its rear side, said side corresponding to the base of the triangle by hangers C′ which are connected by suitable clamps C². The exact construction of the clamping means may be varied to suit the requirements of axles of various constructions. A V-shaped frame D has eyes D′ formed at its free end and these eyes engage the converging side members of the frame C, and as shown in the drawings, I prefer to thicken these side members adjacent the point engaged by the eye D′ as shown at C³, thereby forming collars upon the sides of the frame C integral with the frame and preventing any slipping of the frame D along the sides of the frame C.

To support the upper apex end of the frame D, I provide a bar E which has one end bent to form an eye E′ which engages the horizontal or bow portion of the U-shaped frame B, while the forward end portion of the rod E is bent upon itself to form an eye E² and the extreme end portion projects forwardly and upwardly at an angle to the body portion of the rod. This end portion is also threaded to receive a suitable nut F. An axle G is provided for the rotatable fender, by providing a suitable rod with eyes at each end. One of these eyes G′ engages the apex portion of the frame C, the other eye G² is formed at a right angle to the eye G′ and slips over the projecting threaded portion E³ of the rod E and is locked thereupon by the nut F. The fender G itself is constructed of a plurality of spring metal hoops which are arranged in sets H′ and H². The fender is in shape a double cone, the axis upon which it turns being the rod G and its equatorial axis being the hoop H′ placed at the juncture of the two cones and being of course the hoop of this set, having the greatest diameter. The double cone fender thus formed is covered with wire of a fine mesh which serves to hold the fender in shape and at the same time permits free circulation of air through the fender to the ventilators or air cooling apparatus of the automobile.

It will be obvious from the above description that if the fender strikes any object not fixed while the automobile is moving the impact of the object against the fender will cause it to rotate in one direction or the other depending upon which side of the longitudinal axis of the automobile the object was, or the position of the fender at the moment of contact, as it will be obvious that the fender will swing with the swinging of the steering axle K, from which it is partially supported.

In order to increase the elasticity of the fender a coil spring L is arranged upon the axle G between the upper apex of the fender and the upper eye G². Should the lower portion of the fender be crushed as a result of the collision the fender can be readily removed from the rod G and replaced thereupon in an inverted position, thus reversing the fender and bringing a new uninjured, lower portion into use.

Having thus fully described my invention, what I claim as new and desire to secure by Letters Patent, is:—

1. An automobile fender having the shape of a double cone and rotatably mounted upon suitable bearings.

2. An automobile fender consisting of an upwardly and rearwardly inclined axle, and a double cone of spring metal hoops rotatably mounted upon said axle.

3. An automobile fender consisting of an upwardly and rearwardly extending axle, means for supporting said axle in advance of an automobile and a rotatable fender carried by said axle.

4. A fender for vehicles comprising a substantially triangular frame arranged in advance of the vehicle, a V-tions of the triangular and V-shaped frames, and a rota-shaped frame carried by the first mentioned frame, means for supporting the upper end of the V-shaped frame, a shaft connected to an apex portion of the two frames and a rotatable fender mounted upon said shaft.

5. A fender consisting of a supporting frame, said frame comprising a substantially horizontal triangular frame and an upright V-shaped frame, an axle connected to the apex portions of said frame, and a double cone shaped fender detachably mounted upon said axle, and reversible in case of damage to either of the cone portions.

6. A fender of the kind described consisting of a plurality of spring metal hoops arranged in sets at right angles to each other, forming a double cone, a wire mesh inclosing said double cone, an axle upon which said fender is mounted, the fender being rotatable upon the axle, and a frame for supporting said axle and fender.

7. The combination with the vehicle, a U-shaped frame mounted thereon, a triangular frame suspended from the vehicle axle, a V-shaped frame mounted vertically upon the triangular frame, a rod connected to the bow portion of the U-shaped frame, an axle carried by the apex portions of the triangular and V-shaped frames, and a rotatable hollow fender carried by the axle.

8. The combination with a frame suspended in advance of a vehicle, of a rearwardly and upwardly inclined axle carried by said frame, a reversible fender loosely mounted upon said axle, said fender being formed of oppositely disposed steel bands and having the shape of a double cone, and a coil spring arranged between the upper apex of the fender and the upper end of the axle.

LUTHER PRINCELL BARRETT.

Witnesses:
JOHN P. BEEKER,
ARTHUR W. BEEKER.